United States Patent
Mata

(10) Patent No.: US 12,338,764 B2
(45) Date of Patent: Jun. 24, 2025

(54) HYBRID COMBUSTION-ELECTRIC GENERATOR

(71) Applicant: Chance Mata, Port St. Lucie, FL (US)

(72) Inventor: Chance Mata, Port St. Lucie, FL (US)

(*) Notice: Subject to any disclaimer, the term of this patent is extended or adjusted under 35 U.S.C. 154(b) by 0 days.

(21) Appl. No.: 18/227,384

(22) Filed: Jul. 28, 2023

(65) Prior Publication Data
US 2025/0035034 A1    Jan. 30, 2025

(51) Int. Cl.
| F02B 63/04 | (2006.01) |
| F02B 53/04 | (2006.01) |
| F02B 53/10 | (2006.01) |
| F02B 53/12 | (2006.01) |
| H02K 7/18 | (2006.01) |

(52) U.S. Cl.
CPC ............ *F02B 63/042* (2013.01); *F02B 53/04* (2013.01); *F02B 53/10* (2013.01); *F02B 53/12* (2013.01); *H02K 7/1807* (2013.01); *F02B 2730/01* (2013.01)

(58) Field of Classification Search
CPC ........ F02B 63/042; F02B 53/00; F02B 53/02; F02B 53/04; F02B 53/10; F02B 53/12; F02B 53/14; F02B 75/18; F02B 75/28; F02B 55/02; F02B 55/08; F02B 55/16; F02B 2730/01; F01C 21/08; F01C 9/002; Y02T 10/12
See application file for complete search history.

(56) References Cited

U.S. PATENT DOCUMENTS

| 7,497,285 B1 | 3/2009 | Radev |
| 7,827,956 B2 * | 11/2010 | Ambardekar ........... F01C 1/077 418/36 |
| 7,854,282 B2 | 12/2010 | Lee et al. |
| 8,294,419 B2 | 10/2012 | Sasaki |
| 8,299,741 B2 | 10/2012 | Prasanna |
| 8,418,823 B2 | 4/2013 | Matsumura |
| 9,296,312 B2 | 3/2016 | Zhao |
| 9,664,106 B2 * | 5/2017 | Chiang ..................... F01C 1/39 |
| 9,826,670 B2 | 11/2017 | Nakamura et al. |
| 2010/0025131 A1 | 2/2010 | Gloceri et al. |

FOREIGN PATENT DOCUMENTS

| CN | 104245400 B | 10/2016 |
| JP | 7166685 B2 * | 11/2022 |

OTHER PUBLICATIONS

Machine translation, JP-7166685-B2, Koyu, obtained from https://worldwide.espacenet.com/, pp. 1-19.*

* cited by examiner

Primary Examiner — Grant Moubry
(74) Attorney, Agent, or Firm — Robinson IP Law, PLLC

(57) ABSTRACT

A generator includes one or more combustion units. The generator also includes one or more ring housings coupled between the one or more combustion units. The one or more combustion units and the one or more ring housing form a circular pathway. The generator also includes one or more rotary pistons comprising one or more magnetic devices. The one or more rotary pistons are positioned to travel around the circular pathway when driven by a force generated by combustion in the one or more combustion units. The generator includes one or more coils positioned along the circular pathway. A current is induced in the one or more coils when the one or more magnetic devices pass through the one or more coils.

17 Claims, 11 Drawing Sheets

HYBRID COMBUSTION-ELECTRIC GENERATOR

FIELD

The present invention relates generally to generators, and more particularly, to a hybrid electric-combustion generator.

BACKGROUND

An internal combustion engine is a type of engine that generates power by burning fuel, e.g., gas, inside engine cylinders. The basic components of an internal combustion engine include the engine cylinder, piston, crankshaft, and camshaft. Fuel and air are mixed in the carburetor or fuel injection system and then drawn into the engine cylinder by the downward movement of the piston. The mixture is compressed by the upward movement of the piston, and then ignited by a spark plug or glow plug, causing a controlled explosion. This explosion pushes the piston down, which in turn rotates the crankshaft, transferring the energy generated by the combustion process to the transmission and wheels of the vehicle. The exhaust gases produced during combustion are expelled through the exhaust system. The process of combustion and piston movement is repeated for each cylinder in a four-stroke engine (intake, compression, power, and exhaust) or for every two strokes in a two-stroke engine (intake-compression and power-exhaust). The speed of the engine is controlled by a throttle valve that regulates the amount of air and fuel entering the engine, and the engine timing is controlled by the camshaft.

Overall, internal combustion engines are widely used in vehicles, power generators, and other machinery due to their efficiency, power output, and ease of use. However, they also produce harmful emissions and contribute to air pollution and climate change. A hybrid electric engine combines a traditional internal combustion engine with an electric motor and a battery to improve fuel efficiency and reduce emissions. The internal combustion engine operates in the same way as a conventional car engine, but the electric motor provides additional power to the drivetrain, especially during acceleration or when extra power is needed. The battery is charged through regenerative braking, which converts the kinetic energy generated during braking into electrical energy that can be stored in the battery. The electric motor can also act as a generator, using excess power from the engine to recharge the battery. The hybrid electric engine is controlled by a computer that determines the most efficient way to use the engine and electric motor. For example, the computer can decide to use only the electric motor at low speeds, such as in city driving, and switch to the internal combustion engine at higher speeds, such as on the highway. Overall, the hybrid electric engine allows for greater fuel efficiency, lower emissions, and improved performance compared to a traditional gasoline engine. However, the hybrid electric engine still requires a separate electric motor. With recent demands on combustion fuels and increased environmental concerns regarding the use and supply of fossil fuels, there is a need for a better, cleaner, more efficient method of using those fuels and producing electrical energy.

Accordingly, there is a need for a solution to at least one of the aforementioned problems. For instance, there is an established need for a device or apparatus that efficiently produces electric power.

SUMMARY

One aspect of the present disclosure is directed to a generator. The generator includes one or more combustion units. The generator also includes one or more ring housings coupled between the one or more combustion units. The one or more combustion units and the one or more ring housing form a circular pathway. The generator also includes one or more rotary pistons comprising one or more magnetic devices. The one or more rotary pistons are positioned to travel around the circular pathway when driven by a force generated by combustion in the one or more combustion units. The generator includes one or more coils positioned along the circular pathway. A current is induced in the one or more coils when the one or more magnetic devices pass through the one or more coils.

In another aspect, each of the one or more combustion units include: a housing including an internal cavity; a combustion valve configured to enter the internal cavity and divide the internal cavity into a combustion chamber and a compression chamber; a fuel supply valve configured to deliver a fuel/oxidizer mixture to the combustion chamber; an ignition source configured to ignite the fuel/oxidizer mixture in the combustion chamber; and a compression valve configured to extract, from the compression chamber, compressed gases generated by the motion of the rotary piston.

In another aspect, the internal cavity is formed as a curved cylindrical cavity that operates as a portion of the circular pathway.

In another aspect, the combustion valve includes a valve plate; and one or more biasing springs configured to hold the valve plate with the internal cavity. A piston head of the rotary piston forces the valve plate out of the internal cavity when the rotary piston is in motion.

In another aspect, upon ignition of the fuel within the combustion area, the one or more rotary pistons are driven in a first direction around the circular pathway.

In another aspect, each of the one or more combustion units include: a first auxiliary valve configured to control a pressure of the compressed gases within the compression chamber.

In another aspect, each of the one or more combustion units include: a second auxiliary valve configured to allow gases to flow between the first auxiliary valve and the second auxiliary valve to remove exhaust gasses.

In another aspect, the one or more rotary pistons include one or more sensors to measure conditions within the combustion generator.

In another aspect, an electrical current is applied to the one or more coils to perform one or more of: initiation of rotation of the one or more rotary pistons; or regulation of the rotation of the one or more rotary pistons.

One aspect of the present disclosure is directed to a device including one or more combustion units positioned at equal distances along a ring housing. The ring housing includes a cylindrical cavity. The device includes one or more rotary pistons including one or more magnetic devices. The one or more rotary pistons travel in a circle within the cylindrical cavity due to combustion within the one or more combustion units. The device includes one or more coils positioned along the cylindrical cavity. A current is induced in the one or more coils when the one or more magnetic devices pass through the one or more coils.

In another aspect, each of the one or more combustion units include: a housing including an internal cavity; a combustion valve configured to enter the internal cavity and divide the internal cavity into a combustion chamber and a compression chamber; a fuel supply valve configured to deliver a fuel/oxidizer mixture to the combustion chamber; an ignition source configured to ignite the fuel/oxidizer mixture in the combustion chamber; and a compression valve configured to extract, from the compression chamber, compressed gases generated by the motion of the rotary piston.

In another aspect, the internal cavity is formed as a curved cylindrical cavity that operates as a portion of the circular pathway.

In another aspect, upon ignition of the fuel within the combustion area, the one or more rotary pistons are driven in a first direction around the circular pathway.

In another aspect, each of the one or more combustion units include: a first auxiliary valve configured to control a pressure of the compressed gases within the compression chamber.

In another aspect, each of the one or more combustion units include: a second auxiliary valve configured to allow gases to flow between the first auxiliary valve and the second auxiliary valve to remove exhaust gasses.

In another aspect, the one or more rotary pistons include one or more sensors to measure conditions within the combustion generator.

In another aspect, an electrical current is applied to the one or more coils to perform one or more of: initiation of rotation of the one or more rotary pistons; or regulation of the rotation of the one or more rotary pistons.

One aspect of the present disclosure is directed to a hybrid combustion-electric generator. The generator includes a first combustion unit and a second combustion unit positioned at equal distances along a ring housing. The ring housing includes a cylindrical cavity. The generator includes at least two ring housings coupled between the first combustion unit and the second combustion. A first internal cavity of the first combustion unit, a second internal cavity of the second combustion unit, and the at least two ring housings form a circular pathway. The generator includes a rotary piston including one or more magnetic devices. The rotary piston travels in a circle within the cylindrical cavity based on a force provided by the first combustion unit and the second combustion unit. The generator includes one or more coils positioned along the cylindrical cavity. A current is induced in the one or more coils when the one or more magnetic devices pass through the one or more coils.

In another aspect, the first internal cavity includes a first combustion valve configured to enter the first internal cavity and divide the first internal cavity into a first combustion chamber and a first compression chamber; and the second internal cavity includes a second combustion valve configured to enter the second internal cavity and divide the second internal cavity into a second combustion chamber and a second compression chamber.

In another aspect, after a first combustion in the first combustion chamber, a first motion of the rotary piston generates a first compressed gas with the second compression chamber of the second combustion unit; and after a second combustion in the second combustion chamber, a second motion of the rotary piston generates a second compressed gas with the first compression chamber of the first combustion unit.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
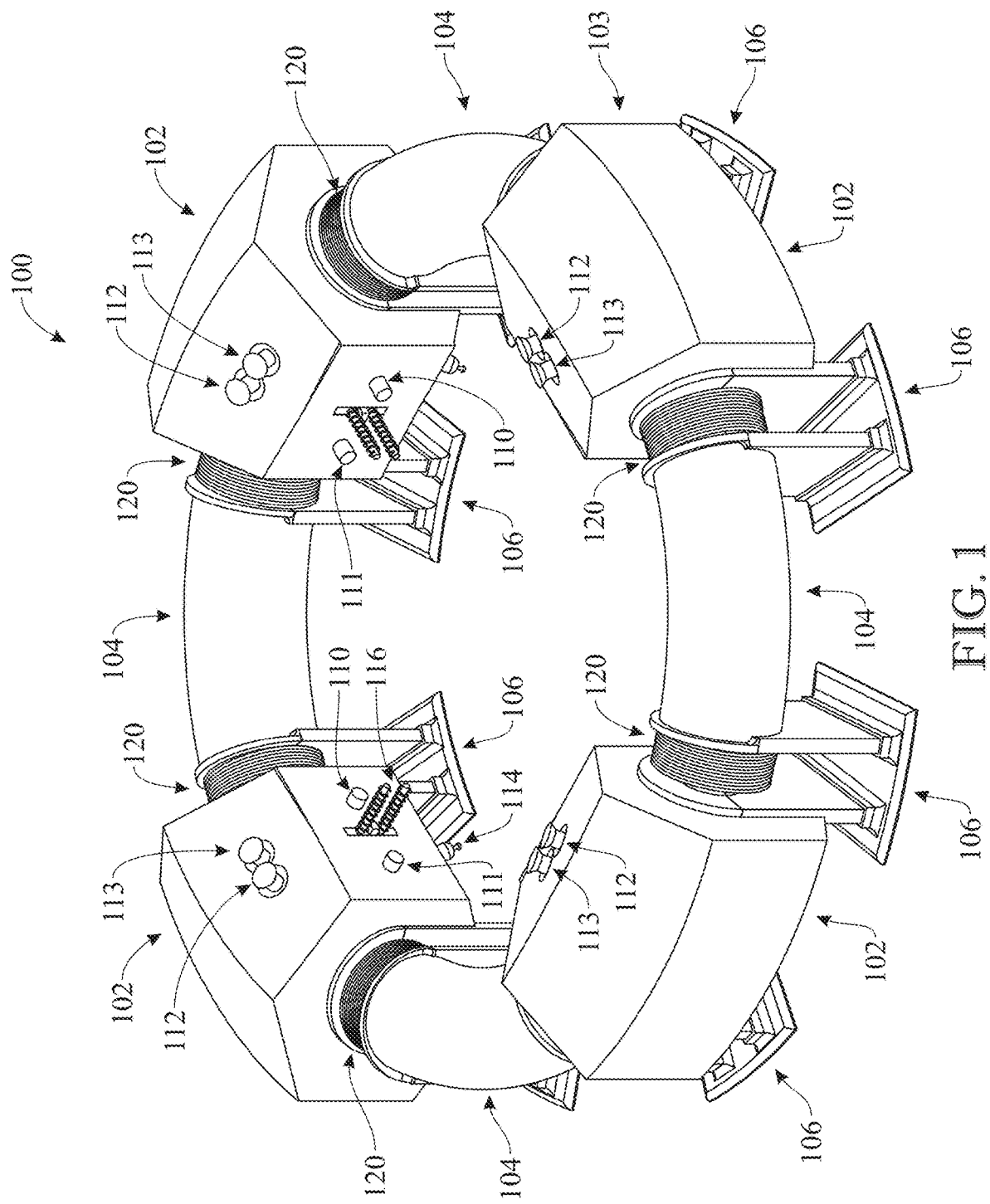
FIG. 1 presents a perspective view of a combustion generator in accordance with an illustrative embodiment of the present disclosure.

Referring initially to FIGS. 1-9, a combustion generator, hereinafter combustion generator 100, is illustrated in accordance with an exemplary embodiment of the present disclosure. FIG. 1 illustrates a perspective view of the combustion generator 100 in accordance with an exemplary embodiment of the present disclosure. As shown, for instance, in FIG. 1, the combustion generator 100 includes one or more combustion units 102. The combustion units 102 operate to cause and control the combustion processes in the combustion generator 100. For example, as illustrated in FIG. 1, the combustion generator 100 can include four (4) combustion units 102 arranged in a circular arrangement. The combustion units 102 can be constructed of any material or combination of materials that provide a structure for controlling and operating the combustion process, for example, metals, metal alloys, composite materials, polymeric materials, and combinations thereof.

The combustion generator 100 operates as a 2-in-1 single-stroke combination engine and electric generator. As such, the combustion method of the combustion generator 100 uses a synthetic compression stroke that differs from a traditional internal combustion engine (ICE) compression stroke. That is, the combustion process of the combustion generates a compression of clean gases to be used for the next combustion cycle. Additionally, a portion of the volume of compressed gases can be used for the combustion process and a portion of the volume can be used to vent exhaust gases generated during combustion and used for cooling the components of the combustion generator 100. The volume of compressed gases can be stored in a reservoir or tank. When a combustion cycle is initiated, a portion of the volume of compressed gases can be pumped to the combustion valve 100 to be mixed with fuel to form the fuel/oxidizer mixture. For example, the compressed gases can be released, via the fuel supply valve 110, as fuel is injected into the compressed gases, thereby mixing with fuel and compressed gases for the next combustion cycle, with the compressed gases operating as an oxidizer. As such, the compression generator can operate as a single-stroke engine.

The combustion units 102 are coupled together by one or more ring housing section 104. For example, as illustrated, the combustion generator 100 can include four (4) ring housing sections. The combustion units 102 and the ring housing section form a rotary piston pathway 250, around which one or more rotary pistons travel in a circular path, as further illustrated and described below in FIG. 6, which is a cross-sectional, top view of the combustion generator 100. The ring housing sections 104 can be constructed of any material or combination of materials that provide a structure for controlling and operating the combustion process, for example, metals, metal alloys, composite materials, polymeric materials, and combinations thereof.

The combustions units 102 and the ring housing sections 104 are supported by one or more struts 106. For example, the combustion generator 100 can include eight (8) struts 106. A pair of the struts 106 can be positioned on opposing sides of the combustion units 102. While FIG. 1 illustrates eight (8) struts, the combustion generator 100 can include any number of struts. The struts 106 can be constructed of any material or combination of materials that provide a structure for controlling and operating the combustion process, for example, metals, metal alloys, composite materials, polymeric materials, and combinations thereof. Additionally, while FIG. 1 illustrates four (4) combustion units 102, the combustion generator 100 can include any number of combustion units 102, with the corresponding number of ring housing sections 104 coupled therebetween to form a rotary piston pathway.

As further illustrated in FIG. 1, the combustion generator 100 includes a number of coils 120. The coils 120 can be formed of circular loops of a conductive material, for example, copper, iron, nickel, silver, etc., and optionally other materials, e.g., polymeric material coating. The coils 120 are positioned to surround the rotary piston pathway such that the one or more rotary pistons travel through the coils as the one or more rotary piston travel around the rotary piston pathway, as described below. That is, the rotary position can include one or more magnetic devices that selectively generate a magnetic field. The coils 120 operate to generate electric energy using electromagnetic induction, as described below in further detail. Electromagnetic induction is a process by which a changing magnetic field produces an electric current in a conductor. When a magnet moves near a conductor, or when the magnetic field around a conductor changes, it induces a flow of electric current in the conductor. This occurs because the changing magnetic field creates an electric field, which in turn drives a current in the conductor. The coils 120 can be coupled to a load, such as a circuit, appliance, a battery, motor, and/or other device that uses and/or stores electrical energy.

The coils 120 can be used to initiate, control, and/or regulate the rotation of the rotary pistons, e.g., rotary piston 140 described below. A current can be selectively applied to one or more of the coils 120 thereby generating an electromagnetic field. For example, a current can be selectively applied, in sequence, to one or more of the coils 120, in relation to the rotary piston, in order to initiate the rotation of the rotary piston. In another example, a current can be applied to one or more of the coils 120 to regulate, e.g., reduce velocity, increase velocity, etc., of the rotary piston.

Each of the combustions units 102 includes a fuel supply valve 110, an compressed gas valve 111, first auxiliary valve 112, a second auxiliary valve 113, an ignition source 114, and a combustion valve 116. The fuel supply valve 110 operates to supply a fuel/oxidizer mixture to the combustion units 102. That is, the fuel supply valve 100 opens to supply the fuel/oxidizer mixture to the combustion units 102. For example, the fuel supply valve 110 can supply a compressed fuel/air mixture to the combustion units 102. The compressed gas valve 111 operates to remove gases generated from combustion from the combustion generator 100. That is, the exhaust valve 110 can close during the combustion phase, and can open during a portion of time between combustion phases to remove gases.

Figure 3:
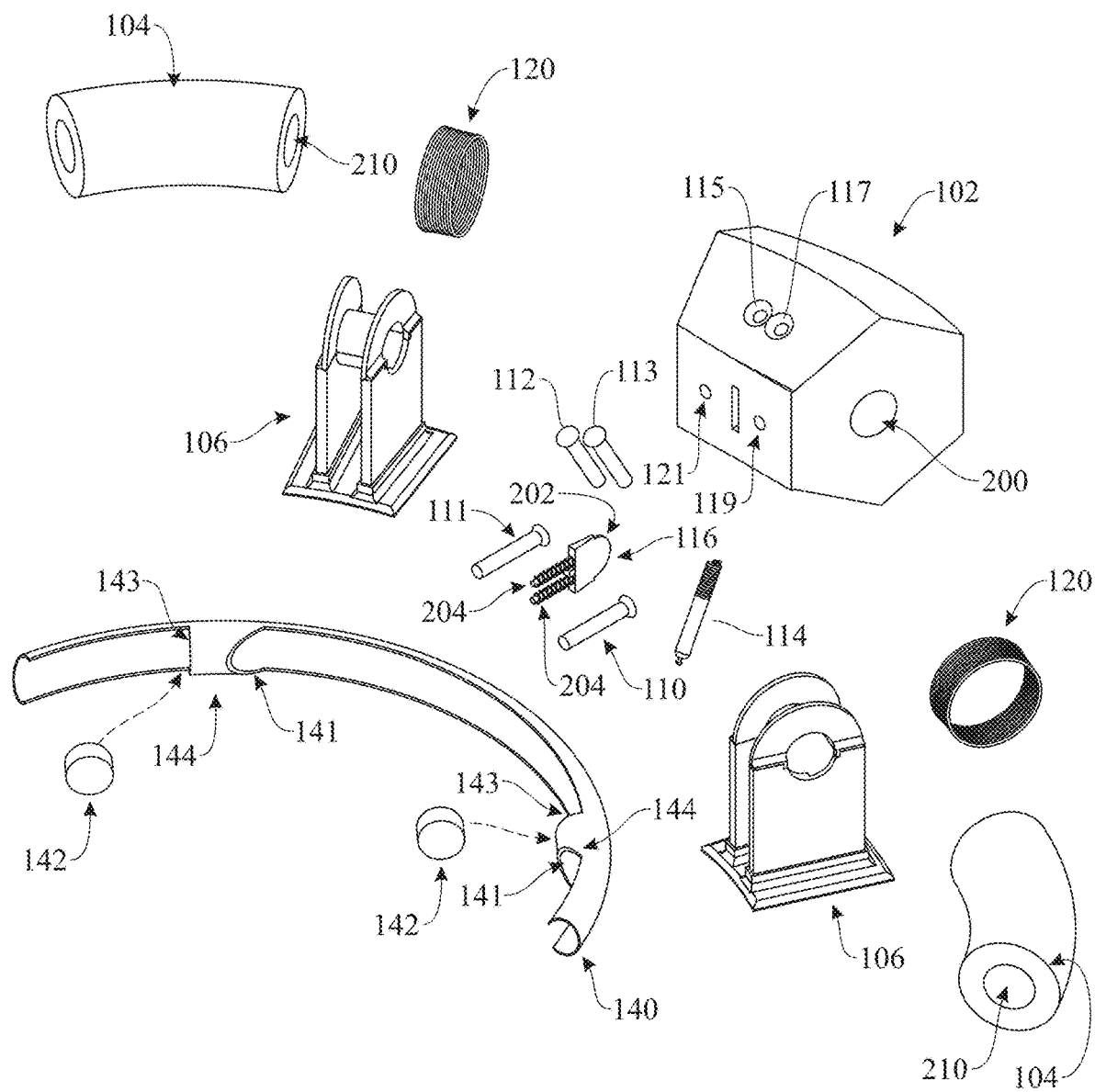
FIG. 3 presents an exploded view of a portion of the combustion generator of FIG. 1 in accordance with an illustrative embodiment of the present disclosure.
Figure 5:
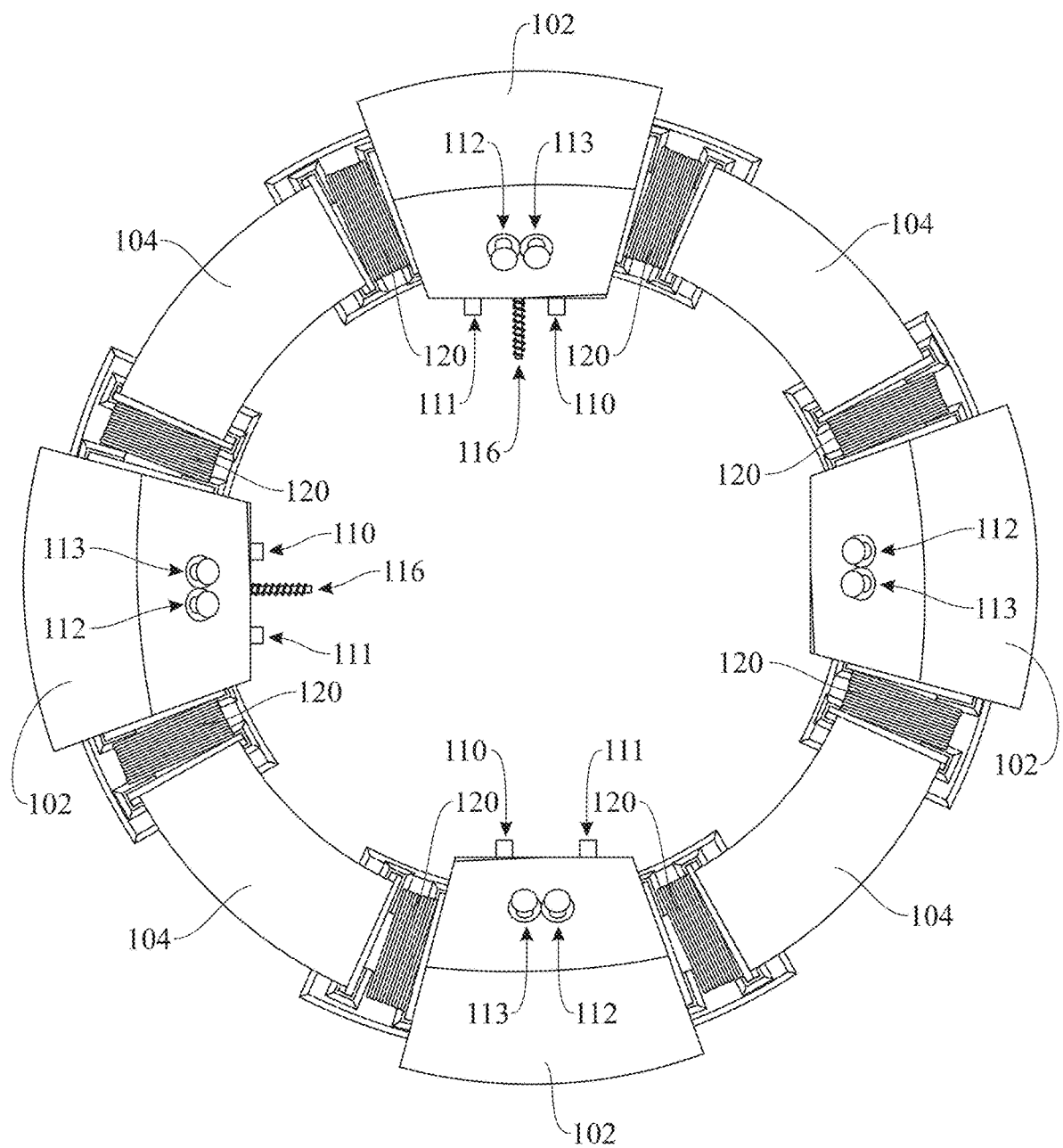
FIG. 5 presents a top view of the combustion generator of FIG. 1 in accordance with an illustrative embodiment of the present disclosure.

As illustrated in FIG. 5, which is a top view of the combustion generator 100, the fuel supply valve 110 and the compressed gas valve 111 can be positioned on an interior surface of the combustion unit 102 on opposing sides of the combustion valve 116. As illustrated in FIG. 3, which is an exploded view of a combustion unit 102, the fuel supply valve 110 and the compressed gas valve 111 can be positioned within a fuel supply via 119 and an exhaust via 121, respectively. The ignition source 114 is inserted into a lower surface of the combustion unit 102. The ignition source 114 can be any type of ignition source such as a spark plug that operates to ignite the fuel/oxidizer mixture that is supplied by the fuel supply valve 110. While one ignition source 114 per combustion unit 102 is illustrated, the combustion generator 100 can include any number of ignition sources 114.

The first auxiliary valve 112 and the second auxiliary valve 113 can operate to remove gases from the combustion generator 100 and/or introduce gases or other materials to the combustion generator 100, as explained below in further detail. As illustrated in FIG. 3, the first auxiliary valve 112 and the second auxiliary valve 113 can be positioned in an upper surface of the combustion unit 102, for example, in an auxiliary valve via 115 and an auxiliary valve via 117 respectively. Any of the fuel supply valve 110, an compressed gas valve 111, a first auxiliary valve 112, a second auxiliary valve 113, and a combustion valve 116 can be constructed of any material or combination of materials that provide a structure for controlling and operating the combustion process, for example, metals, metal alloys, composite materials, polymeric materials, and combinations thereof.

Figure 2:
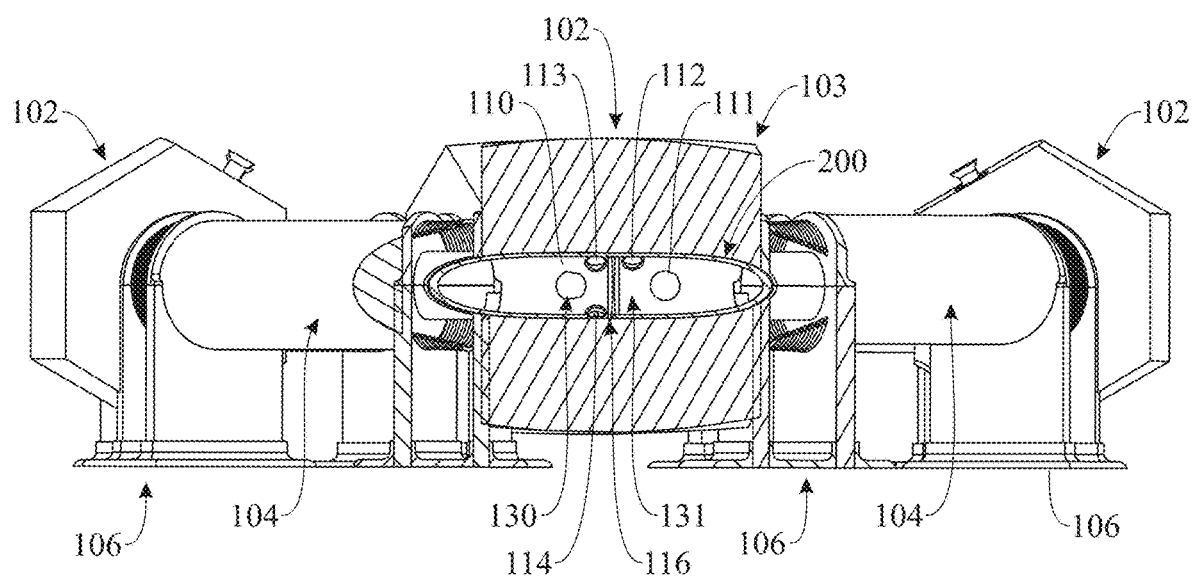
FIG. 2 presents a cross-sectional, perspective view of a combustion unit of the combustion generator of FIG. 1 in accordance with an illustrative embodiment of the present disclosure.

As illustrated in FIG. 2, which is a cross-section view of a combustion unit 103 from the combustion units 102, the combustion unit 103 includes an internal cavity 200. While the combustion generator 100 is described with reference to the one (combustion unit 103) of the combustion units 102, the same detailed description can apply to any of the combustion units 102. The combustion valve 116 is configured to enter the internal cavity 200 when engaged and withdraws from the internal cavity 200 when disengaged. When the combustion valve 116 is disengaged (withdraw from the internal cavity 200), the internal cavity 200 is a single cavity, through which the rotary piston may travel. When the combustion valve is engaged (inserted into the internal cavity 200), the internal cavity 200 is divided into two separate chambers, a combustion chamber 130 and a compression chamber 131. The combustion area is formed in a curved, cylindrical shape.

Figure 6:
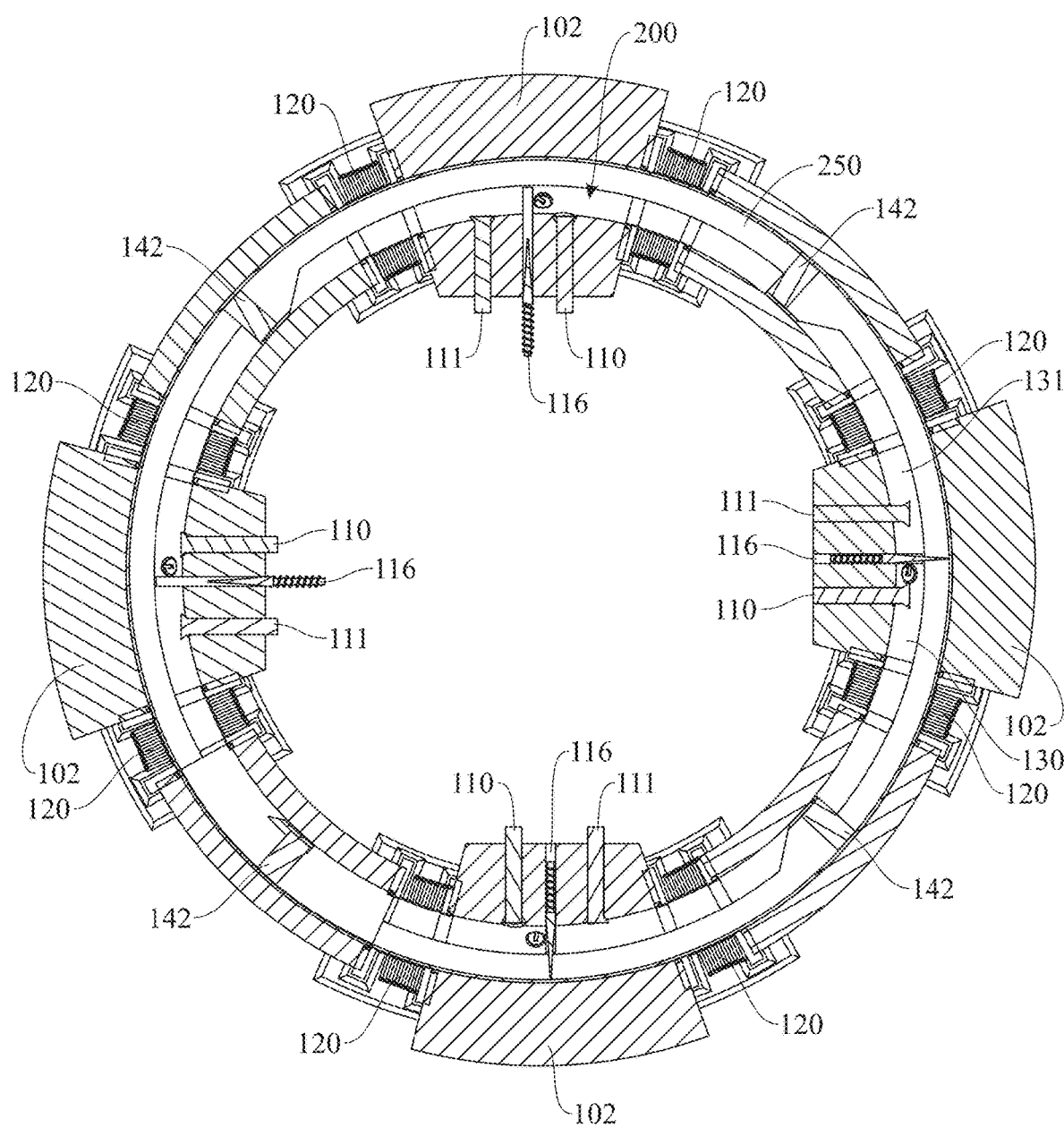
FIG. 6 presents a cross-sectional, top view of the combustion generator of FIG. 1 in accordance with another illustrative embodiment of the present disclosure.

As illustrated in FIG. 3 and FIG. 5, the ring housing section 104 is coupled with the combustions units 102 to form a ring or donut. The ring housing unit sections 104 each includes a cylindrical cavity 210 formed within the ring housing unit sections 104. The cylindrical cavities 210 of the ring housing unit section 104 match with the internal cavity 200 of the combustion units 102 to form the rotary piston pathway 250, as illustrated in FIG. 6. The cylindrical cavities 210 and the internal cavities 200 can be formed to a diameter that is larger than a rotary piston or piston section 140 thereby allowing the rotary piston to travel through the rotary piston pathway 250.

As illustrated in FIG. 3, the combustion generator 100 includes one or more of the rotary pistons or piston section 140. The rotary pistons 140 are configured to slide within the rotary piston pathway 250 formed by the cylindrical cavities 210 of the ring housing unit sections 104 and the internal cavities 200 of the combustion units 102. The rotary piston 140 includes piston heads 144 that operate as a surface by which force generated during the combustion in the combustion units 102 drives the rotary pistons 140 around the cylindrical cavity. The piston heads 144 of the rotary piston 140 can be constructed to activate the one or more of the valves of the combustion generator 100. The piston heads 144 also include a leading edge 141 that is angled or slanted relative to the body of the rotary piston 140. The piston heads 144 also include a trailing edge 143 that is perpendicular to the body of the rotary piston 140.

The piston heads 144 can include one or more magnetic devices 142. The magnetic devices 142 can be any type of device that generates a magnetic field that can be used to generate electrical power through the rotation of the rotary piston 140. For example, the magnetic devices 142 can be a magnet constructed of a magnetic material such as ferromagnetic elements (e.g., iron, nickel, cobalt), alloys containing ferromagnetic elements, rare-earth elements, minerals (e.g., lodestone), and the like. In another example, the magnetic devices 142 can include an electromagnet that generates a magnetic field via an electric current. The electromagnet can include a core formed of a ferromagnetic material surrounded by a coil of conductive wire. Then an electric coil flows through the coil a magnetic field is generated. The current can be supplied by a power source, e.g., rechargeable battery, coupled to the coil. The supply of current can be controlled by electronics contained on the rotary piston 140.

Figure 4:
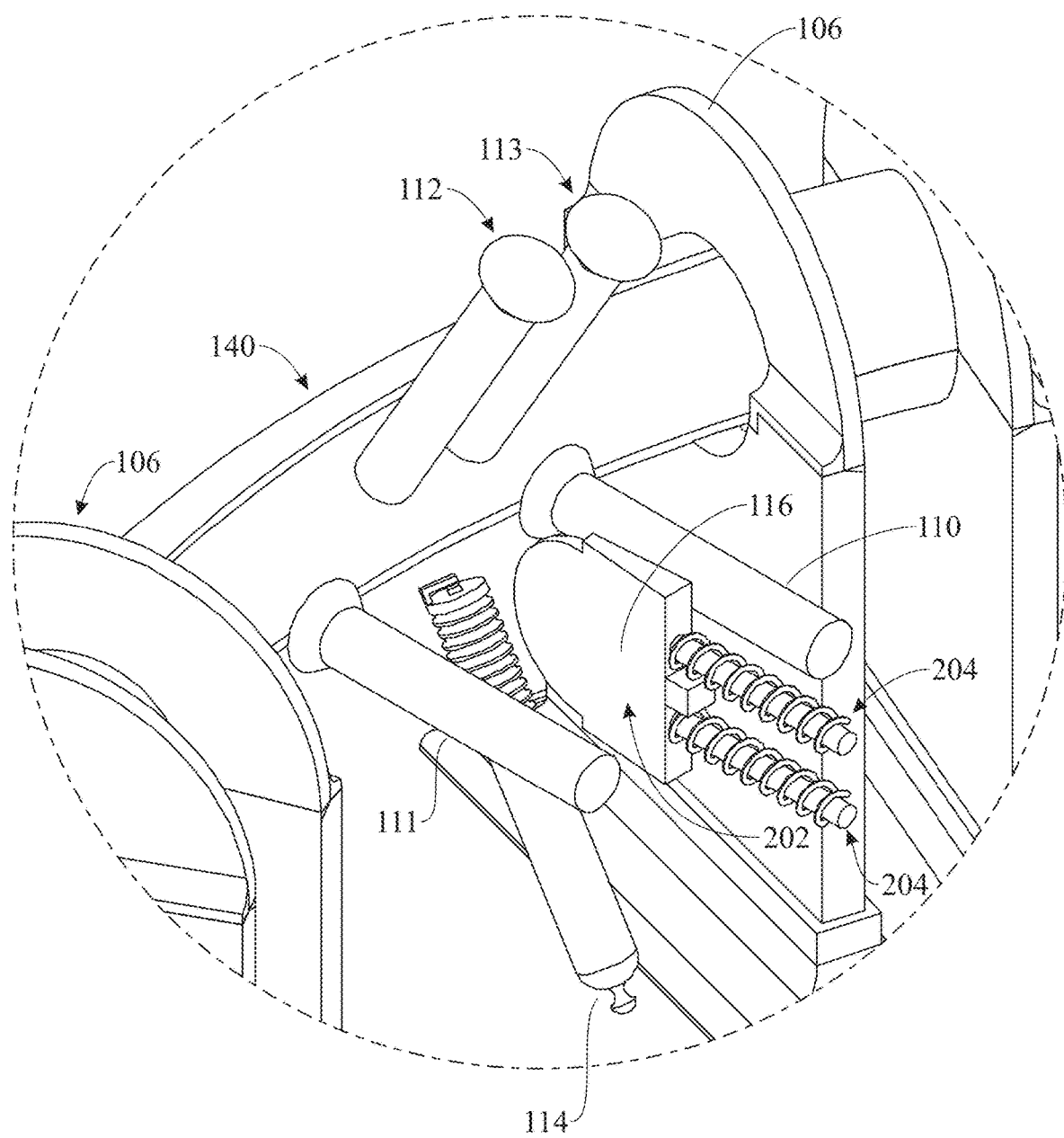
FIG. 4 presents an internal view of the combustion unit of the combustion generator of FIG. 1 in accordance with an illustrative embodiment of the present disclosure.

As illustrated in FIG. 3 and FIG. 4, which is an internal view of the combustion unit 103, the combustion valve 116 can include a mechanism that causes the combustion valve to engage and disengage during the combustion cycle. The mechanism can be any type of mechanical, electro-mechanical, pneumatic, etc. device that causes the combustion valve to engage or disengage at the proper timing and position of the rotary piston. For example, as illustrated the combustion valve 116 can include a valve plate 202. The valve plate 202 is configured to enter the internal cavity 200 of the combustion unit 103 and create a seal, thereby forming the combustion chamber 130 and the compression chamber 131. The combustion valve 116 can include one more biasing springs 204 that apply a force to the valve plate 202 in the direction of the internal cavity 200. In this example, the biasing springs 204 apply a force to engage the combustion valve 116. As the rotary piston 140 rotates with the rotary piston pathway 250 the leading edge 141 of the piston head 144 contact the valve plate 202 of the combustion valve 116. Because the leading edge 141 of the piston head 144 is slanted, the leading edge 141 of the piston head 144 applies a force to the valve plate thereby moving the valve plate 202 out of the internal cavity 200 and compressing the biasing springs 204. The combustion valve 116 is held open by the piston head 144 as the piston head 144 travel past the combustion valve 116. Once the trailing edge 143 passes the combustion valve 116, the force of the compressed biasing springs 204 moves the valve plate 202 into the internal cavity 200 thereby engaging the combustion valve 116.

Figure 8:
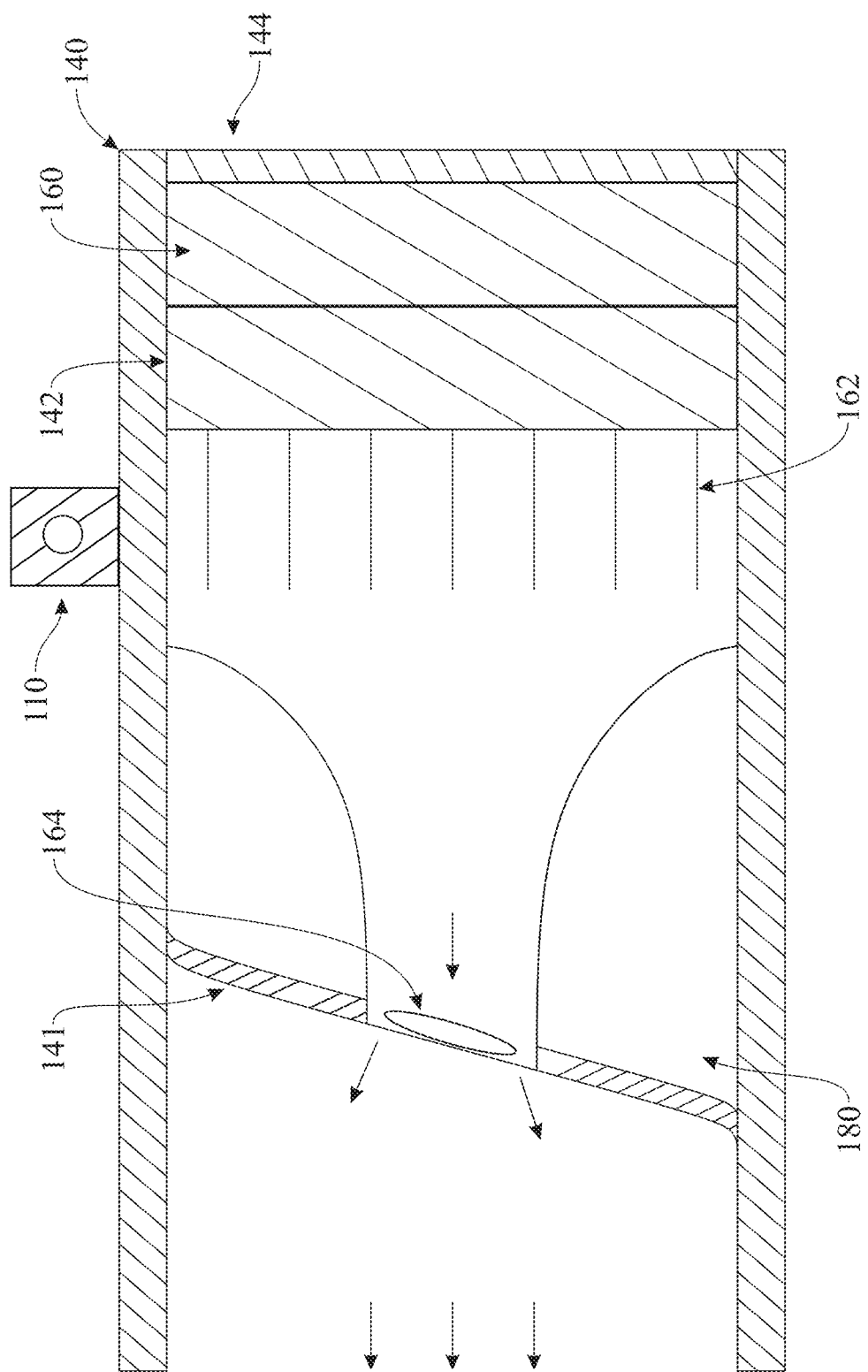
FIG. 8 presents a cross-section, top view of a rotary piston of the combustion generator of FIG. 1 in accordance with another illustrative embodiment of the present disclosure.
Figure 10:
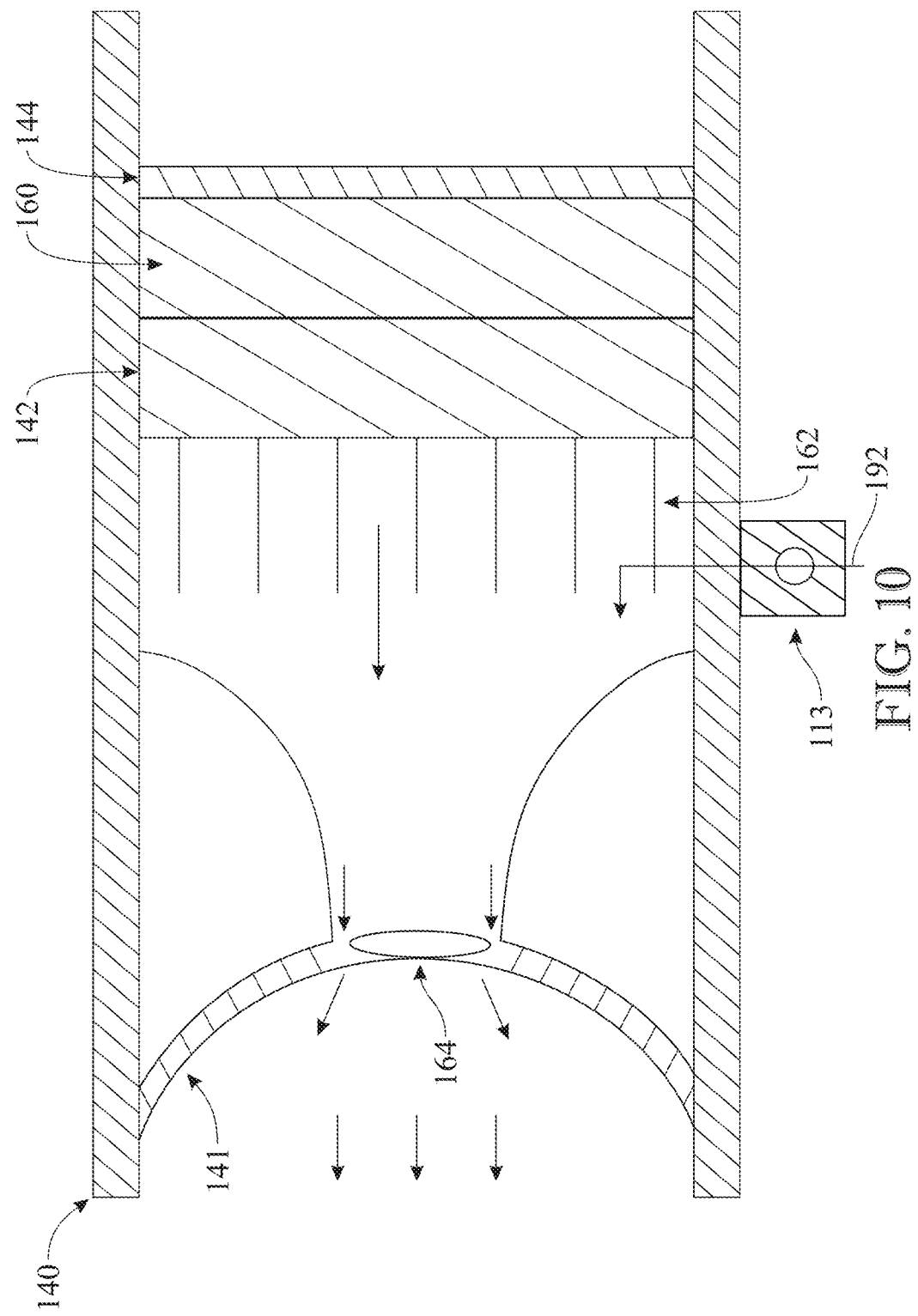
FIG. 10 presents a cross-section, side view of the rotary piston of the combustion generator of FIG. 1 in accordance with another illustrative embodiment of the present disclosure.
Figure 11:
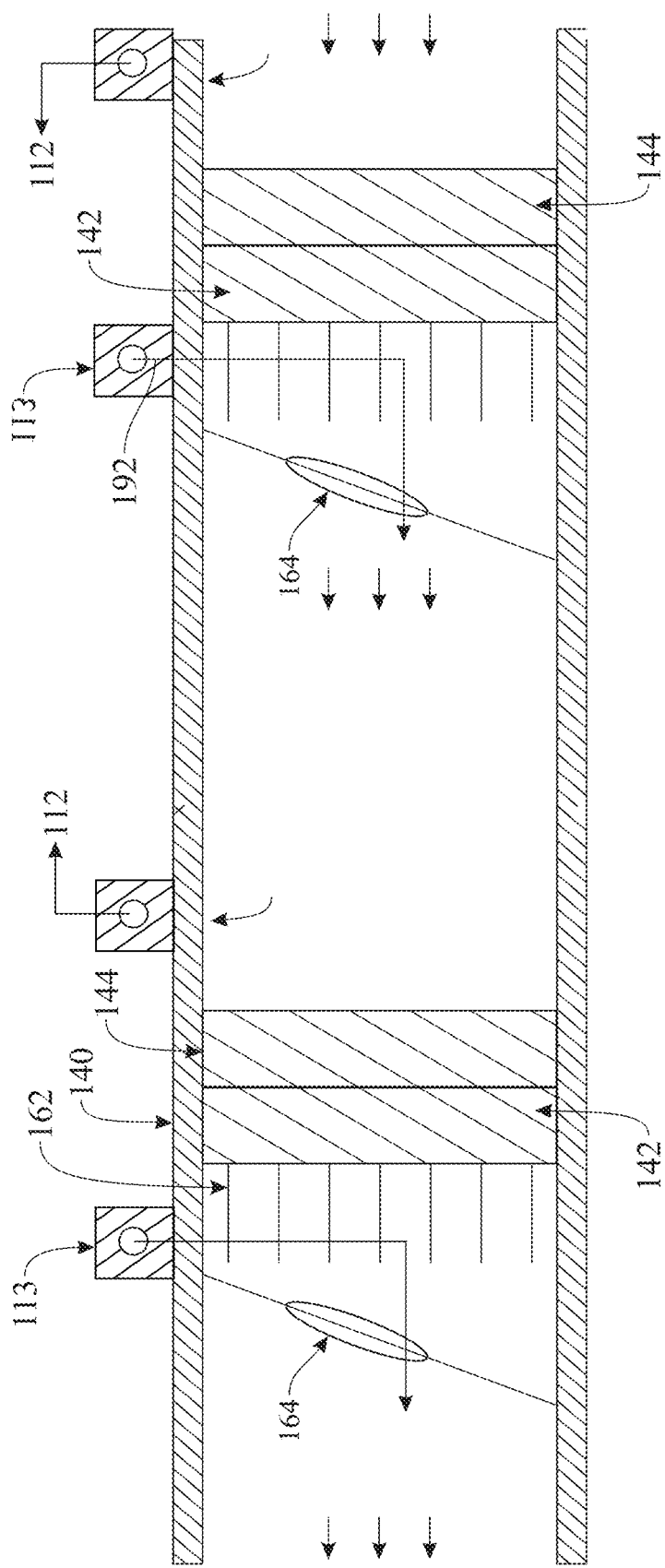
FIG. 11 presents another operation of the combustion generator of FIG. 1 in accordance with an illustrative embodiment of the present disclosure.

As illustrated in FIGS. 8 and 10, which are a top view and a side view respectively of a rotary piston 140, the rotary piston 140 can include insulation between the magnetic device 142 and the piston head 144. The rotary piston 140 can include cooling fins 162, which are coupled to the magnetic device 142. The cooling fins 162 can be formed of metal or other types of thermal conducting materials. The rotary piston 140 also includes an air pressure release valve 164 formed in the trailing surface of the rotary piston 140. The rotary piston 140 can also include one or more electronic devices (e.g., controls, sensors, etc.) that are embedded in the rotary piston 140 to monitor and control the operation of the rotary piston 140. For example, the electronic devices can monitor the temperature, pressure, fuel/air mixture, velocity, etc. during operations, and control the activation of the valves.

Figure 7:
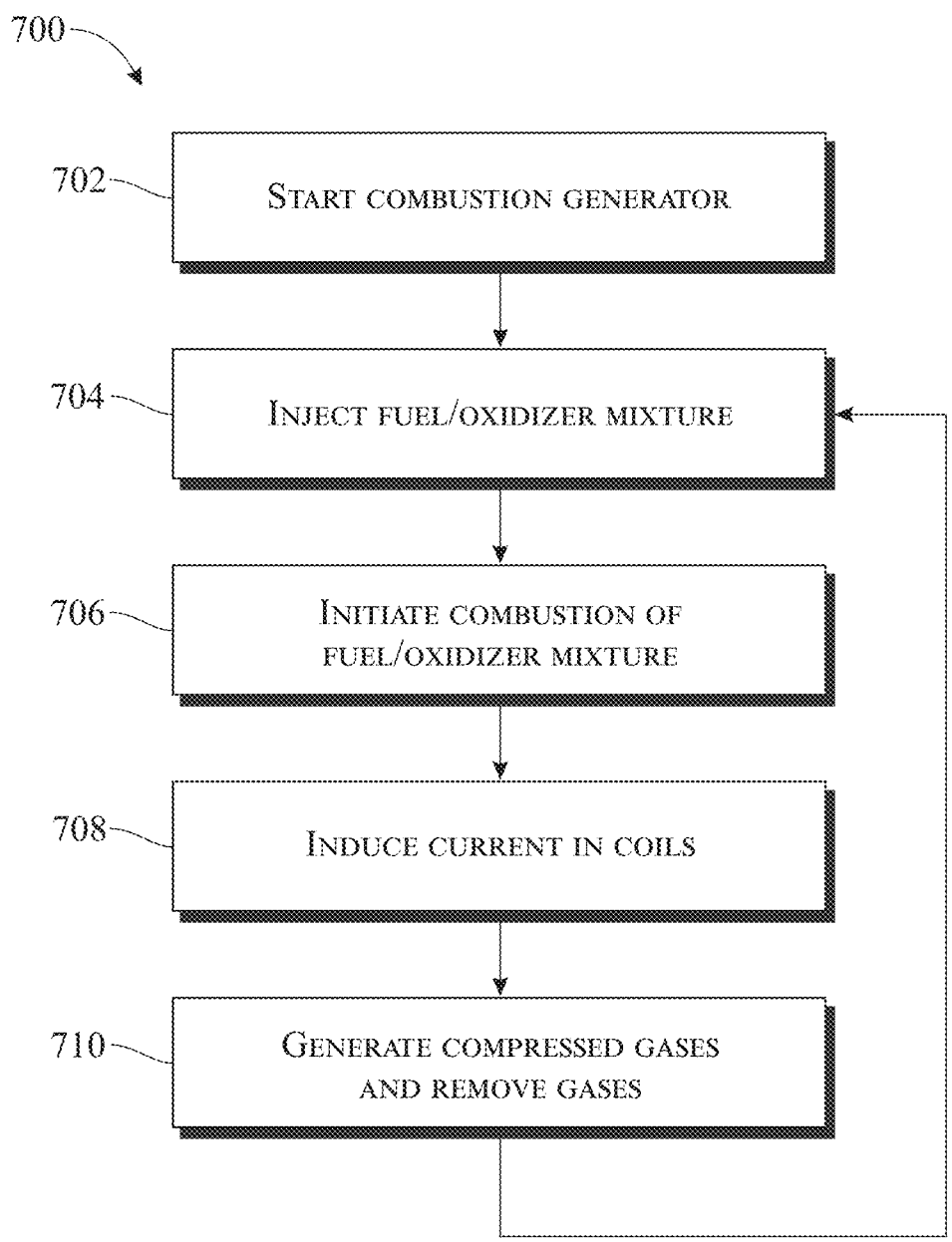
FIG. 7 presents a flow diagram of a rotary combustion process in accordance with an illustrative embodiment of the present disclosure.

As illustrated in FIG. 7, the process 700 begins at 702. At 702, the combustion generator can be started. In embodiments, the combustion generator 100 can include a starter device that initiates the rotation of the rotary piston 140. For example, the starter device can include an electro-mechanical motor that applies a force to the rotary piston 140 to begin the movement of the rotary piston 140 within the rotary piston pathway 250. In another example, a pressured gas can be introduced, via one or more of the auxiliary valve 112 and/or auxiliary valve 113, to the rotary piston pathway 250 to begin the movement of the rotary piston 140 within the rotary piston pathway 250. In examples as illustrated in FIGS. 5 and 6, the rotary piston 140 can be rotated in a clockwise direction when viewed from the top of the combustion generator 100. Once the combustion cycle begins, the starter can be disengaged. In another example, a current can be applied to the coils 120 thereby causing an attraction to and/or repulsion of the magnetic devices 142 of the rotary piston 140 thereby operating as a starter.

For example, as further illustrated in FIG. 8-11, once the combustion generator 100 has been started, the rotary pistons 140, including the magnetic devices 142, rotate in the same direction through the cylindrical cavity. The piston head 144 includes a slight curve in front of the magnetic device 142. The shape of the front (leading edge 141) of piston head 144 is shaped in a certain curve that follows the curve and movement of the combustion valve 116 thereby allowing the piston head 144 to move over the combustion valve 116 and driving open the combustion valve 116. For example, the front of the piston head 144 can be curved to allow contact points to be a flowing movement not a direct impact with the combustion valve 116. As the piston head passes through the combustion area, the piston head 144 drives the combustion valve 116 out of the combustion area. As the piston head 144 passes, the combustion valve 116 returns into the combustion area to form the combustion chamber 130, for example, using biasing springs 204. The combustion valve 116 is closed thereby forming the combustion chambers 130.

At 704, a fuel/oxidizer mixture is injected. In an embodiment, the fuel injector valve 110 is opened and the fuel oxidizer mixture is injected into the combustion chamber 130 through the fuel supply via 119. The fuel injector valve 110 can be activated once the trailing edge 143 of the piston head 144 passes the combustion valve 116 and the combustion valve 116 engages thereby creating the combustion chamber 130. For example, a fuel oxidizer mixture 190 is injected between the valve plate 202 of the combustion valve 116 and the trailing edge 143 of the piston head 144, as further illustrated in FIG. 9.

Figure 9:
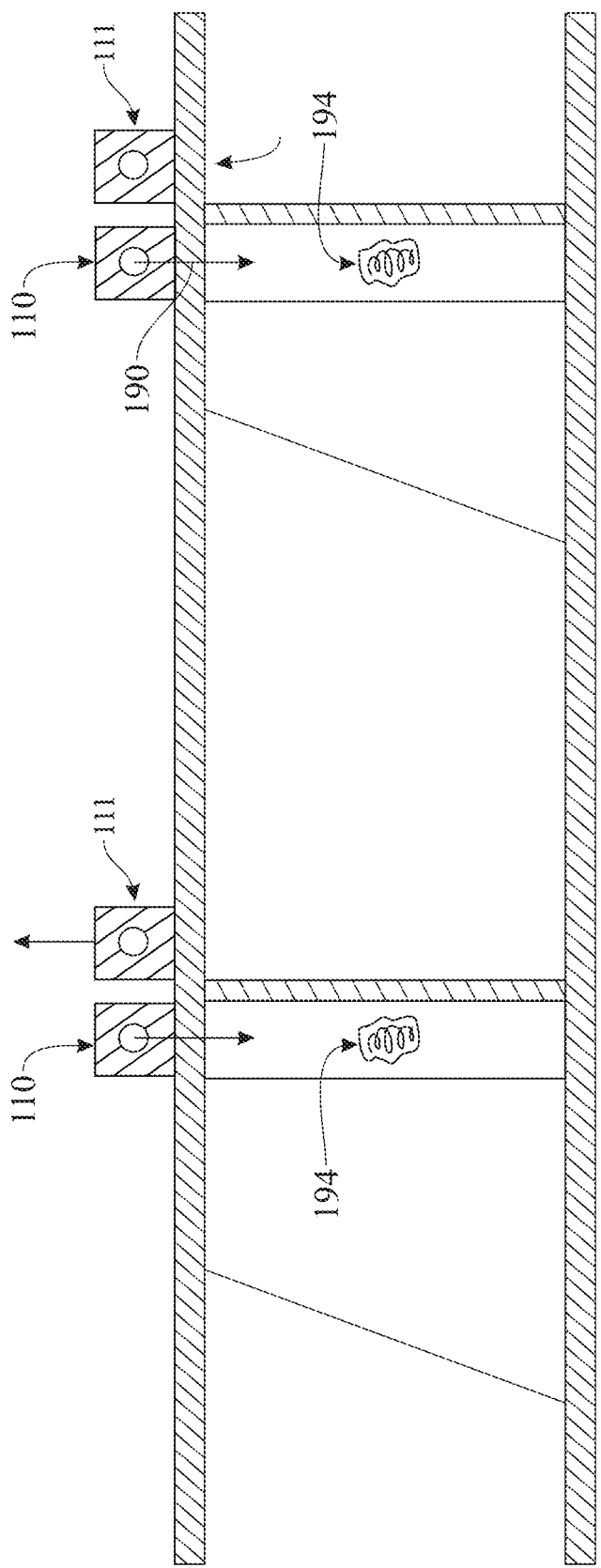
FIG. 9 presents an operation of the combustion generator of FIG. 1 in accordance with an illustrative embodiment of the present disclosure.

At 706, combustion of the fuel/oxidizer mixture is initiated. In an embodiment, the ignition source 114 can be activated thereby igniting the fuel oxidizer mixture within the combustion chamber 130. The expanding gases formed between the trailing edge 143 of the piston head 144 and the valve plate 202 of the combustion valve 116 apply a force to the piston head 144 causing the rotary piston 140 to continue rotation within the rotary piston pathway 250. As illustrated in FIG. 9, the ignition source 114 ignites the compressed fuel thereby driving the rotary pistons 140. The rotary piston 140 including the magnetic devices 142 rotate around the rotary piston pathway 250 and pass through the coils 120, thereby inducing a current in the coils.

At 708, current is induced in the coils. As the expanding gases formed between the trailing edge 143 of the piston head 144 and the valve plate 202 of the combustion valve 116 apply a force to the piston head 144, the piston head 144 including the magnet 142 travel out of the combustion unit 102 through the coils 120. As the magnetic devices 142 travel through the coils 120, a current is induced in the coils 120, e.g., converting the mechanical energy of the rotary piston 140 to electrical energy supplied to a load coupled to the combustion generator 100.

As such, the rotary pistons 140 flow in a single direction with only a slowing down of velocity but never actually reach a point of zero velocity other than the start and end of the device running. As the rotary pistons 140, including the magnetic devices 142, rotate around together, combustion occurs in the combustion unit thereby increasing the velocity of the rotary pistons 140, including the magnetic devices 142. As the magnetic devices 142 rotate or move away from the combustion units 102, the magnetic devices 142 pass through the coils 120 producing power. The creation of the power generated can be proportional to the decrease in velocity of the magnetic devices 142. Additionally, the expansion/combustion process creates a momentum of the rotary pistons 140, including the magnetic devices 142, that will eventually create a slight vacuum in the combustion area of the combustion units 102 behind it as distance increases. This resulting cooling of the system as an intake valve allows clean air in and pushes exhaust gasses out of the valves as the momentum carries the rotary pistons 140, including the magnetic devices 142, as described below. When the rotary pistons 140, including the magnetic devices 142, slow down, the rotary pistons 140, including the magnetic devices 142, enter another combustion unit 102 for the next cycle. In some examples, all the combustion units 102 can fire at the same time allowing a uniform change in momentum.

At 710, compressed gases are generated, and exhaust gases are removed. In embodiments, the compressed gases are generated and the exhaust gases can be removed using one or more of the compressed gas valve 111, the auxiliary valve 112, and the auxiliary valve 113. As illustrated in FIGS. 8 and 10 and further in FIGS. 9 and 11, timing and control of the valves can be used for the compression of air for combustion as well as the removal of exhaust gases and cooling of the rotary piston 140 and magnet 102.

For example, in some embodiments, after the combustion cycle and the rotary piston 140 leaves one combustion unit 102 traveling to the next combustion unit 102, the gases in front of the piston head 144 can compress the gasses with the compression chamber 131. The pressure within the combustion generator 100 can be controlled using the auxiliary valve 112. As compression is occurring, the auxiliary valve 112 may be opened. The control of the auxiliary valve 112 being open/closed may depend on the amount of pressure desired. For example, if the auxiliary valve 112 is open during the complete expansion process, the pressure generated may be lower, but the velocity of the rotary piston 140 may be higher. If more/higher pressure is desired, the auxiliary valve 112 can remain closed until desired pressure internally is reached. Once the desired pressure is, for example, 200 psi, the compressed valve 111 can open thereby allowing pressure in the cylinder to drop and transport that air into a 2nd chamber outside of this system for cooling and for the future use of this air. The positioning of the valve 112 and the valve 113 can control the timing in which they are opened and closed.

In another example, opening a combination of the compressed gas valve 111, the auxiliary valve 112, and the auxiliary valve 113 can be used to cool the components of the rotary piston 140 and vent the exhaust gases created by the combustion process. For example, as the piston head 144 exits the combustion unit 102, a vacuum is created behind the piston head 144. Once the piston head 144 enters the next combustion unit 102 and the combustion valve 116 is opened, the auxiliary valve 113 can be opened to the internal areas of the piston head 144, and one or more of the compressed gas valve 111 and the auxiliary valve 112 are opened at the same time. The flow of air enters the rotary piston 140 via the auxiliary valve 113 to cool the magnetic devices 142 as it moves through the combustion cycle as well as the creation of clean compressed air. For example, the auxiliary valve 113 can open up with pressures ranging from 20 to 50 psi. When the auxiliary valve 113 opens, air may enter and flow onto the cooling fins 162 coupled to the magnetic devices 142 thereby assisting in heat dissipation from the magnetic devices 142. Concurrently, the air can cause the air pressure release valve 164 to open and create an airflow between the auxiliary valve 113 and one or more of the compressed gas valve 111 and the auxiliary valve 112.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A generator comprising:
one or more combustion units each comprising:
a housing comprising an internal cavity,
a combustion valve configured to enter the internal cavity and divide the internal cavity into a combustion chamber and a compression chamber,
a fuel supply valve configured to deliver a fuel/oxidizer mixture to the combustion chamber,
an ignition source configured to ignite the fuel/oxidizer mixture in the combustion chamber, and
a compression valve configured to extract, from the compression chamber, compressed gases generated by the motion of the one or more rotary pistons;
one or more ring housings coupled between the one or more combustion units, wherein the one or more combustion units and the one or more ring housing form a circular pathway;
one or more rotary pistons comprising one or more magnetic devices, wherein the one or more rotary pistons are positioned to travel around the circular pathway when driven by a force generated by combustion in the one or more combustion units; and
one or more coils positioned along the circular pathway, wherein a current is induced in the one or more coils when the one or more magnetic devices pass through the one or more coils.

2. The generator of claim 1 wherein the internal cavity is formed as a curved cylindrical cavity that operates as a portion of the circular pathway.

3. The generator of claim 1 wherein the combustion valve comprises:
a valve plate; and
one or more biasing springs configured to hold the valve plate with the internal cavity, wherein a piston head of the rotary piston forces the valve plate out of the internal cavity when the rotary piston is in motion.

4. The generator of claim 1 wherein:
upon ignition of the fuel within the combustion area, the one or more rotary pistons are driven in a first direction around the circular pathway.

5. The generator of claim 1 wherein each of the one or more combustion units comprises:
a first auxiliary valve configured to control a pressure of the compressed gases within the compression chamber.

6. The generator of claim 5 wherein each of the one or more combustion units comprises:
a second auxiliary valve configured to allow gases to flow between the first auxiliary valve and the second auxiliary valve to remove exhaust gasses.

7. The generator of claim 1, wherein the one or more rotary pistons include one or more sensors to measure conditions within the generator.

8. The device of claim 1, wherein an electrical current is applied to the one or more coils to perform one or more of:
initiation of rotation of the one or more rotary pistons; or
regulation of the rotation of the one or more rotary pistons.

9. A device comprising:
one or more combustion units positioned at equal distances along a ring housing, wherein the ring housing comprises a cylindrical cavity, wherein each of the one or more combustion units comprises:
a housing comprising an internal cavity,
a combustion valve configured to enter the internal cavity and divide the internal cavity into a combustion chamber and a compression chamber,
a fuel supply valve configured to deliver a fuel/oxidizer mixture to the combustion chamber,
an ignition source configured to ignite the fuel/oxidizer mixture in the combustion chamber, and
a compression valve configured to extract, from the compression chamber, compressed gases generated by the motion of the one or more rotary pistons;
one or more rotary pistons comprising one or more magnetic devices, wherein the one or more rotary pistons travel in a circle within the cylindrical cavity due to combustion within the one or more combustion units; and
one or more coils positioned along the cylindrical cavity, wherein a current is induced in the one or more coils when the one or more magnetic devices pass through the one or more coils.

10. The device of claim 9 wherein the internal cavity is formed as a curved cylindrical cavity that operates as a portion of the circular pathway.

11. The device of claim 9 wherein:
upon ignition of the fuel within the combustion area, the one or more rotary pistons are driven in a first direction around the circular pathway.

12. The device of claim 9 wherein each of the one or more combustion units comprises:
a first auxiliary valve configured to control a pressure of the corn pressed gases within the compression chamber.

13. The device of claim 12 wherein each of the one or more combustion units comprises:
a second auxiliary valve configured to allow gases to flow between the first auxiliary valve and the second auxiliary valve to remove exhaust gasses.

14. The device of claim 9, wherein the one or more rotary pistons include one or more sensors to measure conditions within the generator.

15. The device of claim 9, wherein an electrical current is applied to the one or more coils to perform one or more of:
initiation of rotation of the one or more rotary pistons; or
regulation of the rotation of the one or more rotary pistons.

16. A hybrid combustion-electric generator, the generator comprising:
a first combustion unit and a second combustion unit positioned at equal distances along a circular pathway, wherein each of the first combustion unit and the second combustion unit comprises:
a housing comprising an internal cavity,
a combustion valve configured to enter the internal cavity and divide the internal cavity into a combustion chamber and a compression chamber,
a fuel supply valve configured to deliver a fuel/oxidizer mixture to the combustion chamber, an ignition source configured to ignite the fuel/oxidizer mixture in the combustion chamber, and a compression valve configured to extract, from the compression chamber, compressed gases generated by the motion of the one or more rotary pistons;

at least two ring housings coupled between the first combustion unit and the second combustion unit, wherein each of the at least two ring housings comprises a cylindrical cavity, wherein a first internal cavity of the first combustion unit, a second internal cavity of the second combustion unit, and the at least two ring housings form the circular pathway;

a rotary piston comprising one or more magnetic devices, wherein the rotary piston travels in a circle within the cylindrical cavity based on a force provided by the first combustion unit and the second combustion unit; and one or more coils positioned along the cylindrical cavity, wherein a current is induced in the one or more coils when the one or more magnetic devices pass through the one or more coils.

17. The generator of claim 16 wherein:

after a first combustion in the first combustion chamber, a first motion of the rotary piston generates a first compressed gas with the second compression chamber of the second combustion unit; and after a second combustion in the second combustion chamber, a second motion of the rotary piston generates a second compressed gas with the first compression chamber of the first combustion unit.

\* \* \* \* \*